US011300655B2

(12) United States Patent
Menaker et al.

(10) Patent No.: US 11,300,655 B2
(45) Date of Patent: Apr. 12, 2022

(54) OBJECT DETECTION USING RADAR

(71) Applicant: GM GLOBAL TECHNOLOGY OPERATIONS LLC, Detroit, MI (US)

(72) Inventors: Yonattan Menaker, Modeiin Maccabim Reut (IL); Arye Lerner, Kefar Yona (IL); Moshe Shapiro, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 398 days.

(21) Appl. No.: 16/561,369

(22) Filed: Sep. 5, 2019

(65) Prior Publication Data
US 2021/0072345 A1 Mar. 11, 2021

(51) Int. Cl.
*G01S 7/292* (2006.01)
*G01S 13/50* (2006.01)
*G01S 13/34* (2006.01)
*G01S 7/40* (2006.01)
*G01S 7/288* (2006.01)
*G01S 13/28* (2006.01)
*G01S 13/58* (2006.01)
*G01S 7/35* (2006.01)
*G01S 13/931* (2020.01)
*G01S 7/02* (2006.01)
*G01S 13/02* (2006.01)

(52) U.S. Cl.
CPC .............. *G01S 7/2927* (2013.01); *G01S 7/023* (2013.01); *G01S 7/288* (2013.01); *G01S 7/354* (2013.01); *G01S 7/356* (2021.05); *G01S 7/4017* (2013.01); *G01S 7/4056* (2013.01); *G01S 13/282* (2013.01); *G01S 13/34* (2013.01); *G01S 13/505* (2013.01); *G01S 13/584* (2013.01); *G01S 13/931* (2013.01); *G01S 7/2883* (2021.05); *G01S 2013/0254* (2013.01)

(58) Field of Classification Search
CPC .... G01S 7/2927; G01S 13/505; G01S 7/2883; G01S 7/354; G01S 7/356; G01S 7/4017; G01S 13/584; G01S 13/931; G01S 7/023
See application file for complete search history.

(56) References Cited

U.S. PATENT DOCUMENTS 9,746,549 B1 * 8/2017 Parker ................... G01S 7/2922
2016/0084941 A1 * 3/2016 Arage ................... G01S 13/584
 342/91
2016/0146925 A1 * 5/2016 Millar ....................... G01S 7/42
 342/113

(Continued)

*Primary Examiner* — Thomas M Hammond, III
(74) *Attorney, Agent, or Firm* — Lorenz & Kopf LLP

(57) ABSTRACT

Method and systems for object detection using a radar module are disclosed. Frames of range and doppler data are received from a radar module at sample time intervals. Doppler zero slice data is extracted from a current frame of the range and doppler data. A prediction of doppler zero slice data is maintained. The prediction of doppler zero slice data is based at least partly on doppler zero slice data from a previous frame of range and doppler data. Standard deviation data is determined based at least partly on prediction error data. The prediction error data relates to a difference between the prediction of doppler zero slice data and the doppler zero slice data. An object detection output is determined based on a comparison of the standard deviation data and an object detection threshold.

19 Claims, 9 Drawing Sheets

(56) References Cited

U.S. PATENT DOCUMENTS

2017/0146638 A1* 5/2017 Aoyama ............... G01S 13/532
2017/0293025 A1* 10/2017 Davis .................... G01S 13/878
2020/0142048 A1* 5/2020 Shayovitz ............. G01S 13/449

* cited by examiner

OBJECT DETECTION USING RADAR

TECHNICAL FIELD

The present disclosure generally relates to vehicles, and more particularly relates to methods and systems for object detection in vehicles using radar.

BACKGROUND

Certain vehicles today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. Some radar modules can be subject to short range leakage, SRL, disturbances at short range distances leading to false positives in the short range area or unused sensing data in the short range area.

Accordingly, it is desirable to provide techniques for mitigating SRL signal disturbance issues in radar systems. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method of object detection using a radar module is provided. The method includes receiving, from a radar module, frames of range and doppler data at sample time intervals. Each frame of the range and doppler data includes an array including range bins and doppler bins. Doppler zero slice data is extracted from a current frame of the range and doppler data. The doppler zero slice data corresponds to a zero doppler bin that has been extracted from remaining doppler bins in the range and doppler data and also corresponds to at least one range bin at a low-end distance range that has been extracted from remaining higher range bins in the range and doppler data. A prediction of doppler zero slice data is maintained. The prediction of doppler zero slice data is based at least partly on doppler zero slice data from a previous frame of range and doppler data. Standard deviation data is determined based at least partly on prediction error data. The prediction error data is related to a difference between the prediction of doppler zero slice data and the doppler zero slice data. An object detection output is provided based on a comparison of the standard deviation data and an object detection threshold.

In embodiments, the range and doppler data includes a complex array including $n_{range\ bins}$ by $n_{doppler\ bins}$ by $n_{channels}$, wherein $n_{range\ bins}$ is an integer number of range bins greater than one in the complex array of range doppler data, $n_{doppler\ bins}$ is an integer number of doppler bins greater than one in the complex array of range doppler data and $n_{channels}$ is an integer number of one or greater in the complex array of range doppler data and corresponds to a number of channels of the radar module In embodiments, the doppler zero slice data includes a complex array including $p_{range\ bins}$ by one doppler zero bin by $n_{channels}$, wherein $p_{range\ bins}$ is an integer number of range bins of one or greater, $p_{range\ bins}$ is less than $n_{range\ bins}$ and $p_{range\ bins}$ has been extracted from a low range end of $n_{range\ bins}$ in the complex array of range doppler data. In embodiments, the prediction of doppler zero slice data represents how the doppler zero slice data looks when there is no target in the field of view.

In embodiments, the method includes determining standard deviation data by calculating Mahalanobis distances based at least partly on a difference between the prediction of doppler zero slice data and the doppler zero slice data. In embodiments, the calculation of Mahalanobis distances uses covariance matrices for the prediction error data.

In embodiments, when one or more conditions for updating are determined to be true, the method includes updating the covariance matrices based on the prediction error data determined for the current frame of range and doppler data.

In embodiment, the range and doppler data includes a three-dimensional array including range bins as a first dimension, doppler bins as a second dimension and channels as a third dimension, wherein each channel corresponds to a channel of the radar module. The standard deviation data includes an average of Mahalanobis distances for each of the at least one range bin that has been averaged over each channel.

In embodiments, when one or more conditions for updating are determined to be true, the method includes updating the prediction of doppler zero slice data based on the prediction error data determined for the current frame of range and doppler data and prediction drift data related to rate of change of the prediction of doppler zero slice data.

In embodiments, when the one or more conditions for updating are determined to be false, the method includes updating the prediction of doppler zero slice data based on prediction drift data related to rate of change of the prediction of doppler zero slice data.

In embodiments, the one or more conditions include a first condition of determining whether values of the standard deviation data exceed an anomaly detection threshold, wherein the anomaly detection threshold is lower than the object detection threshold and a second condition of determining whether the first condition is true for each of a predetermined number of successive frames of range and doppler data, or a third condition of the standard deviation data being less than the anomaly detection threshold.

In embodiments, the prediction of doppler zero slice data is determined by scaling and rotating the prediction of doppler zero slice data relative to the doppler zero slice data using a best fit function to cancel out mutual phase and gain variations.

In embodiments, the range and doppler data includes a three-dimensional array including range bins as a first dimension, doppler bins as a second dimension and channels as a third dimension, wherein each channel corresponds to a channel of the radar module.

In embodiments, the method includes determining a cleaned version of the range doppler data cleaned for effects of short-range leakage, SRL, based on an SRL attenuation function that subtracts the prediction of doppler zero slice data and a calculated propagation thereof.

In accordance with another exemplary embodiment, a system for object detection is provided. The system includes a radar module, and at least one processor. The at least one processor is configured for receiving, from the radar module, frames of range and doppler data at sample time intervals. Each frame of the range and doppler data includes an array including range bins and doppler bins. Doppler zero slice data is extracted from a current frame of the range and doppler data. The doppler zero slice data corresponds to a zero doppler bin that has been extracted from remaining doppler bins in the range and doppler data and also corresponds to at least one range bin at a low-end distance range that has been extracted from remaining higher range bins in the range and doppler data. A prediction of doppler zero slice data is maintained. The prediction of doppler zero slice data is based at least partly on doppler zero slice data from a previous frame of range and doppler data. Standard deviation data is determined based at least partly on prediction error data. The prediction error data relates to a difference between the prediction of doppler zero slice data and the doppler zero slice data. An object detection output is provided based on a comparison of the standard deviation data and an object detection threshold.

In embodiments, the range and doppler data includes a three-dimensional array including range bins as a first dimension, doppler bins as a second dimension and channels as a third dimension, wherein each channel corresponds to a channel of the radar module.

In embodiments, the radar module includes at least one transmitter and receiver antenna corresponding to a channel of the radar module, the at least one transmitter configured to transmit Frequency-Modulated Continuous Wave, FMCW, chirps at respective time intervals and the receiver is configured to output receive signals correspond to each FMCW chirp.

In embodiments, the system includes at least one signal processor configured to perform a range fast Fourier transform, FFT, function on each receive signal to provide range data for each receive signal and to perform a doppler FFT function on the range data for a plurality of receive signals to provide range doppler data. The at least one signal processor is configured to arrange the range doppler data into bins for each channel of the radar module as part of providing the frames of range and doppler data at sample time intervals.

In embodiments, the at least one processor is configured to determine standard deviation data by, at least in part, calculating Mahalanobis distances based at least partly on a difference between the prediction of doppler zero slice data and the doppler zero slice data. In embodiments, the range and doppler data includes a three-dimensional array including range bins as a first dimension, doppler bins as a second dimension and channels as a third dimension, wherein each channel corresponds to a channel of the radar module, and the standard deviation data includes an average of Mahalanobis distances for each of the at least one range bin that has been averaged over each channel.

In embodiments, when one or more conditions for updating are determined to be true, the at least one processor is configured for updating the prediction of doppler zero slice data based on the prediction error data determined for the current frame of range and doppler data and prediction drift data related to rate of change of the prediction of doppler zero slice data, and when the one or more conditions for updating are determined to be false, the at least one processor is configured for updating the prediction of doppler zero slice data based on prediction drift data related to rate of change of the prediction of doppler zero slice data. In embodiments, the one or more conditions include a first condition of determining whether values of the standard deviation data exceed an anomaly detection threshold, wherein the anomaly detection threshold is lower than the object detection threshold and a second condition of determining whether the first condition is true for each of a predetermined number of successive frames of range and doppler data, or a third condition of the standard deviation data being less than the anomaly detection threshold.

In accordance with an exemplary embodiment, a vehicle is provided. The vehicle includes at least one radar module; and at least one processor. The at least one processor is configured for receiving, from the at least one radar module, frames of range and doppler data at sample time intervals, each frame of the range and doppler data including an array including range bins and doppler bins. Doppler zero slice data is extracted from a current frame of the range and doppler data. The doppler zero slice data corresponds to a zero doppler bin that has been extracted from remaining doppler bins in the range and doppler data and also corresponds to at least one range bin at a low-end distance range that has been extracted from remaining higher range bins in the range and doppler data. A prediction of doppler zero slice data is maintained. The prediction of doppler zero slice data is based at least partly on doppler zero slice data from a previous frame of range and doppler data. Standard deviation data is determined based at least partly on prediction error data. The prediction error data relates to a difference between the prediction of doppler zero slice data and the doppler zero slice data. An object detection output is provided based on a comparison of the standard deviation data and an object detection threshold. A vehicle function is commanded based on the object detection output.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
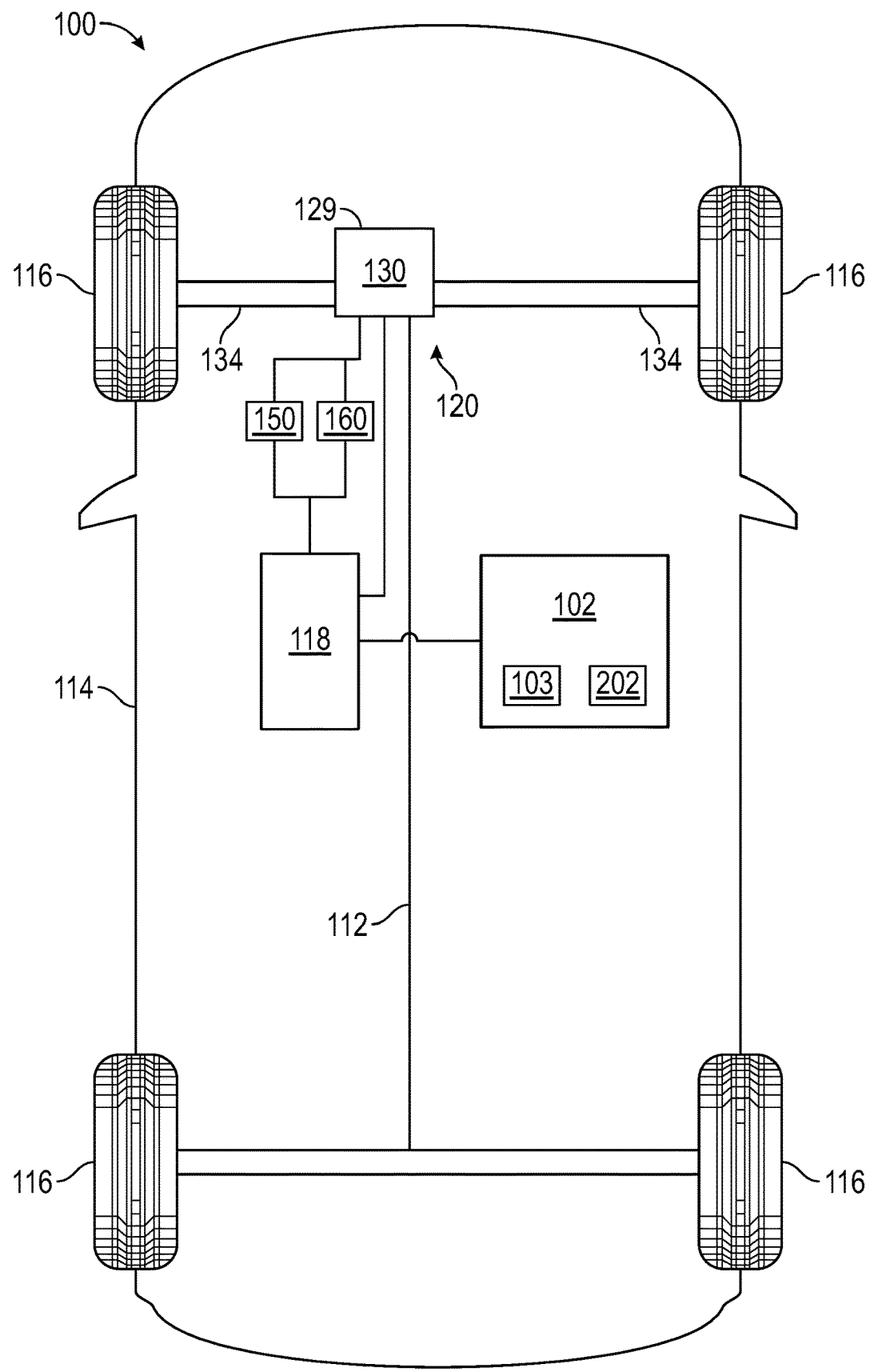
FIG. 1 is a functional block diagram of a vehicle that includes a control system including a radar module, in accordance with an exemplary embodiment.

FIG. 1 illustrates a vehicle 100, or automobile, according to an exemplary embodiment. As described in greater detail further below, the vehicle 100 includes a control system 102 for implementation of short-range leakage SRL mitigation for a radar module 202 (FIGS. 2 and 3) as described herein. In embodiments described in the following, the radar module 202 is an ultra-short-range radar, USRR, module. USRR radars are capable of detecting object at ranges of 30 cm or less, 20 cm or less or 10 cm or less and include a zero-distance range measurement. USRR radars are capable of separating objects at a separation distance of 15 cm or less or 10 cm or less. Thus, the output of a USRR module is a point cloud of more than 1000 points per frame allowing an image to be constructed of an environment. In one embodiment, the control system 102 provides for extracting doppler zero slice data, comparing the doppler zero slice data with a prediction therefor as part of an anomaly detection process and detecting an object based thereon, as will be described further herein. Further, the control system 102 provides for cleaning range doppler data for the effects of SRL leakage, as will be described in detail below.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 10 may differ from that depicted in FIG. 1. For example, in certain embodiments the number of wheels 116 may vary. By way of additional example, in various embodiments the vehicle 10 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver. Similar to the discussion above regarding possible variations for the vehicle 10, in certain embodiments the vehicle 10 may not include a steering wheel and/or steering. In addition, in certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 10, in certain embodiments steering, braking, and/or acceleration can be commanded by a computer instead of by a driver (in one such embodiment, a computer of the vehicle may use input from the radar system to steer, brake, and/or accelerate the vehicle).

The control system 102 is mounted on the chassis 112. As mentioned above, the control system 102 provides for extracting doppler zero slice data at low distance range bins from range doppler data received from USRR module 202, thereby focusing on cells subject to SRL disturbance. A prediction of doppler zero slice data is maintained by the control system 102 to represent a normal condition. Anomalies from the normal condition are detectable by the control system 102, which responsively outputs object detection data for use in controlling at least one vehicle function, e.g. via actuator assembly 120 and/or the electronic control system 118. Further, the control system 102 can use the extracted doppler zero slice data, particularly, the maintained prediction of doppler zero slice data, to clean range doppler data received from USRR module 202 from the effects of SRL disturbances. The control system 102, in one example, provides these functions in accordance with the method 400 described further below in connection with FIGS. 4A and 4B and the associated data transformations and processes of FIGS. 5 to 11.

While the control system 102 and the USRR module are depicted as being part of the same system, it will be appreciated that in certain embodiments these features may comprise two or more systems. It will also be appreciated that the description refers to USRR module 202 in the singular in instances herein, but vehicle 100 will generally include a plurality of USRR modules 202, such as at least five USRR modules 202 or at least ten. In addition, in various embodiments the control system 102 may comprise all or part of, and/or may be coupled to, various other vehicle devices and systems, such as, among others, the actuator assembly 120, and/or the electronic control system 118.

Figure 2:
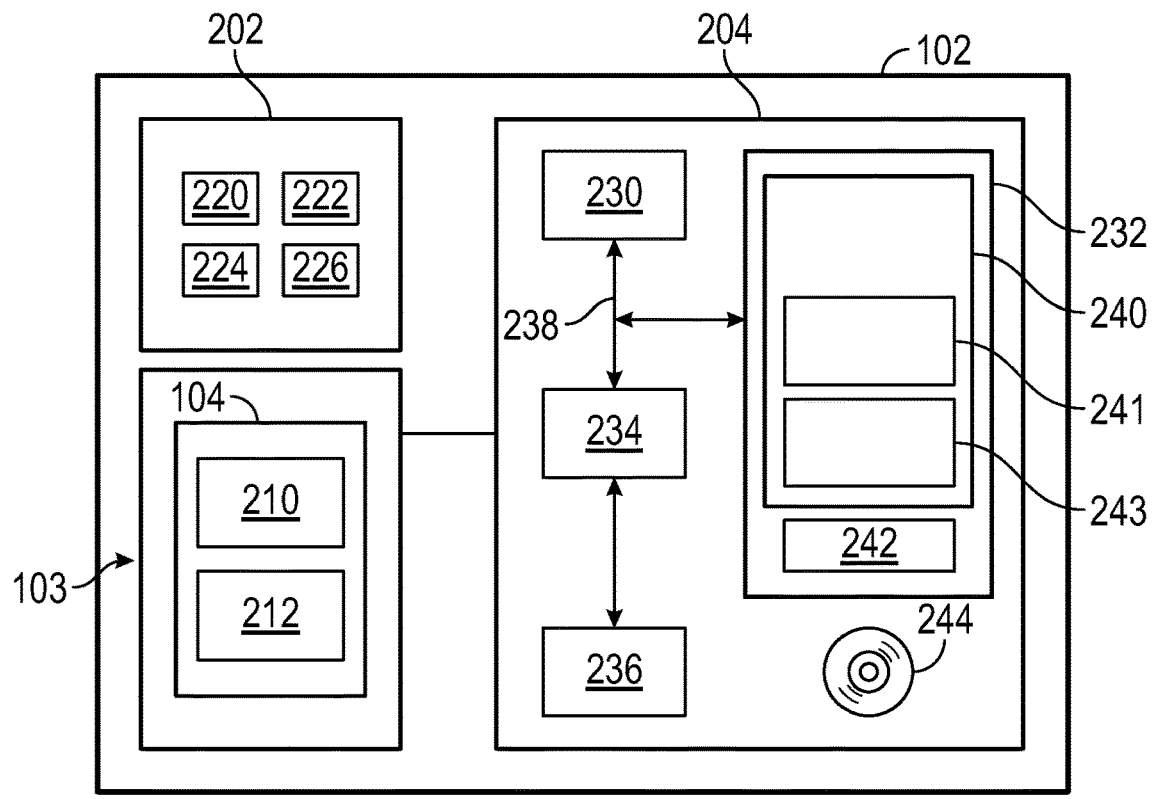
FIG. 2 is a functional block diagram of the control system of the vehicle of FIG. 1, in accordance with an exemplary embodiment.

With reference to FIG. 2, a functional block diagram is provided for the control system 102 of FIG. 1, in accordance with an exemplary embodiment. As depicted in FIG. 2, the control system 102 includes a USRR module 202 and a controller 204.

The USRR module 202 is included as part of the vision system 103, which may include one or more additional sensors 104 as shown in FIGS. 1 and 2. In the depicted embodiment, the sensors 104 include one or more cameras 210 and one or more light detection and ranging (LIDAR) systems 212. The camera(s) 210 and LIDAR system(s) 212 obtain respective sensor information identifying objects on or near a road in which the vehicle 100 is travelling, such as moving or stationary vehicles on or alongside the road, pedestrians, bicyclists, animals, buildings, trees, guard rails, medians, and/or other objects on or alongside the road. In one embodiment, the one or more sensors 104 and the USRR module 202 may be part of a vision system 103.

Also as depicted in FIG. 2, the USRR module 202 includes a transmitter 220 (also referred to herein as a transmitter antenna), a receiver 222 (also referred to herein as a receiver antenna) and a signal processing unit 226. The transmitter 220 transmits radar signals that in the form of time separated, frequency modulated chirps. After the transmitted radar signals contact one or more objects on or near a road on which the vehicle 100 is located (either stationary or travelling) and is reflected/redirected toward the USRR module 202, the redirected radar signals are received by the receiver 222 of the USRR module for processing.

The signal processing unit 226 processes the received radar signals to provide range doppler data, in accordance with the method 400 described further below in connection with FIGS. 4 to 11. Specifically, in one embodiment, the signal processing unit 226 applies two dimensional fast Fourier transforms, FFTs, to the received radar signal to generate range doppler data for subsequent processing by an SRL mitigation computer module 241 (FIG. 2) and, ultimately, an object detection computer module 243. The signal processing unit 226 of the illustrated embodiment is capable of executing one or more programs (i.e., running software) to perform various tasks instructions encoded in the program(s). In the illustrated embodiment, the signal processing unit 226 is part of the USRR module 202, but it could be otherwise located such as part of the processing capabilities of the controller 204.

The signal processing unit 226 may be a microprocessor, microcontroller, application specific integrated circuit (ASIC) or other suitable device as realized by those skilled in the art. The USRR module 202 may include multiple signal processing units 226, working together or separately, as is also realized by those skilled in the art. In certain embodiments, the signal processing unit 226 also includes or is associated with a memory (not depicted) of the vision system 103 for storing values (for example, previously stored waveforms of the transmitted radar signals) for use in the method 400 of FIGS. 4A and 4B. In addition, it is noted that in certain embodiments, these functions may be performed in whole or in part by one or more other processors disposed outside the USRR module 202, such as the processor 230 of the controller 204 described further below.

As depicted in FIG. 2, the controller 204 is coupled to the USRR module 202 and the sensors 104. Similar to the discussion above, in certain embodiments the controller 204 may be disposed in whole or in part within or as part of the USRR module 202. In addition, in certain embodiments, the controller 204 is also coupled to one or more other vehicle systems (such as the electronic control system 118 of FIG. 1). The controller 204 receives the information sensed or determined from the USRR module and the sensors 104. In one embodiment, the controller 204 receives range doppler data from the USRR module 202 and extracts doppler zero slice data for SRL mitigation processing. The controller 204 generally performs these functions in accordance with the method 400 discussed further below in connection with FIGS. 4 to 11.

As depicted in FIG. 2, the controller 204 comprises a computer system. In certain embodiments, the controller 204 may also include one or more of the USRR module 202, sensor(s) 104, one or more other systems, and/or components thereof. In addition, it will be appreciated that the controller 204 may otherwise differ from the embodiment depicted in FIG. 2. For example, the controller 204 may be coupled to or may otherwise utilize one or more remote computer systems and/or other control systems, such as the electronic control system 118 of FIG. 1.

In the depicted embodiment, the computer system of the controller 204 includes a processor 230, a memory 232, an interface 234, a storage device 236, and a bus 238. The processor 230 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 204 and the computer system of the controller 204, generally in executing the processes described herein, such as the method 400 described further below in connection with FIGS. 4 to 11. The one or more programs 240 include an SRL mitigation computer module 241 and an object detection computer module 243 for performing steps of method 400 described in detail below. Although SRL mitigation computer module 241 is shown included under computer programs in FIG. 2, it should be understood that the SRL mitigation computer module 241 could be stored as a computer program in memory of USRR module 202 and executed by at least one processor of USRR module 202.

The memory 232 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 232 is located on and/or co-located on the same computer chip as the processor 230. In the depicted embodiment, the memory 232 stores the above-referenced program 240 along with one or more stored values 242 for use in making the determinations.

The bus 238 serves to transmit programs, data, status and other information or signals between the various components of the computer system of the controller 204. The interface 234 allows communication to the computer system of the controller 204, for example from a system driver and/or another computer system, and can be implemented using any suitable method and apparatus. The interface 234 can include one or more network interfaces to communicate with other systems or components. The interface 234 may also include one or more network interfaces to communicate with technicians, and/or one or more storage interfaces to connect to storage apparatuses, such as the storage device 236.

The storage device 236 can be any suitable type of storage apparatus, including direct access storage devices such as hard disk drives, flash systems, floppy disk drives and optical disk drives. In one exemplary embodiment, the storage device 236 comprises a program product from which memory 232 can receive a program 240 (including computer modules 241 and 243) that executes one or more embodiments of one or more processes of the present disclosure, such as the steps of the method 400 (and any sub-processes thereof) described further below in connection with FIGS. 4 to 11. In another exemplary embodiment, the program product may be directly stored in and/or otherwise accessed by the memory 232 and/or a disk (e.g., disk 244), such as that referenced below.

The bus 238 can be any suitable physical or logical means of connecting computer systems and components. This includes, but is not limited to, direct hard-wired connections, fiber optics, infrared and wireless bus technologies. During operation, the program 240 is stored in the memory 232 and executed by the processor 230.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
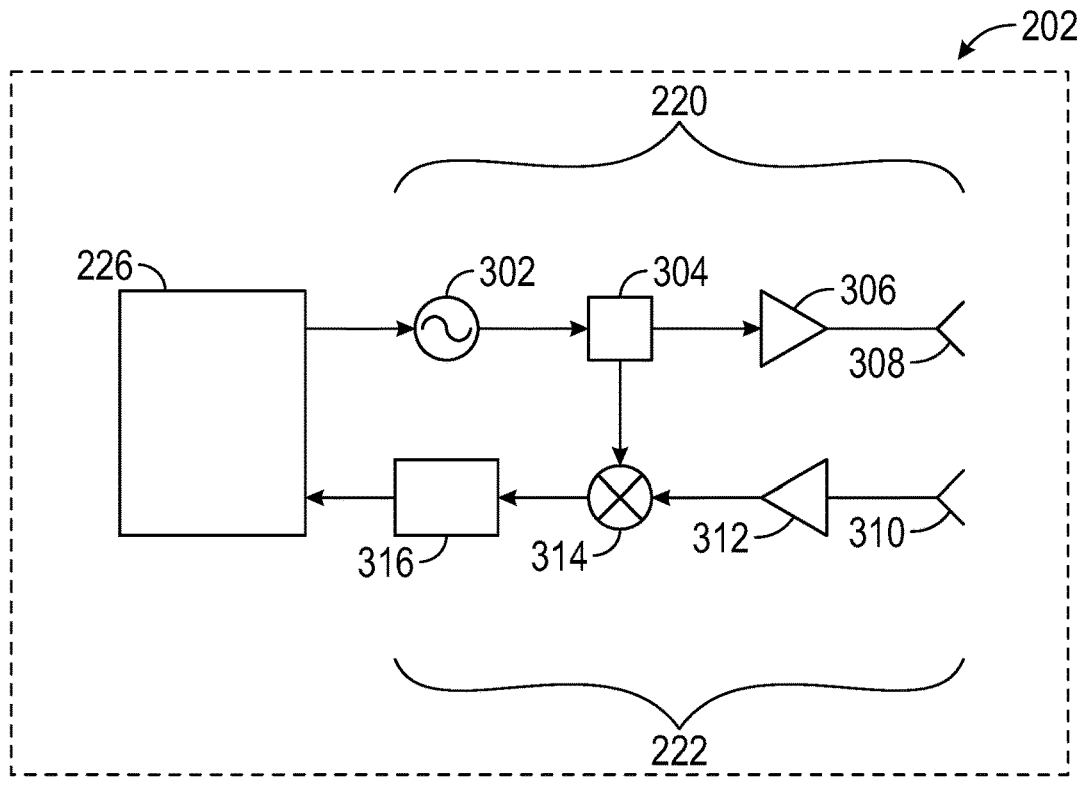
FIG. 3 is a functional block diagram of a radar module of the control system of FIGS. 1 and 2, in accordance with an exemplary embodiment.

FIG. 3 is a functional block diagram of the USRR module 202 of the control system 102 of FIGS. 1 and 2, in accordance with an exemplary embodiment. As depicted in FIG. 3, the USRR module 202 includes the transmitter 220, the receiver 222 and the signal processing unit 226 of FIG. 2. The transmitter 220 includes a signal generator 302, a filter 304, an amplifier 306, and an antenna 308. The receiver 222 includes an antenna 310, an amplifier 312, a mixer 314, and a sampler/digitizer 316. In certain embodiments the antennas 308, 310 may comprise as single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers.

The USRR module 202 generates the transmittal radar signals via the signal generator 302 based upon instructions provided by the processing unit 226 of FIG. 2. The transmittal radar signals are filtered via the filter 304, amplified via the amplifier 306, and transmitted from USRR module 202 (and from the vehicle 100) via the transmitter antenna 308. The transmitting radar signals subsequently contact other vehicles and/or other objects on or alongside the road adjacent the vehicle 100. After contacting the other vehicles and/or other objects, the radar signals are reflected, and travel from the other vehicles and/or other objects in various directions, including some signals returning toward the vehicle 100. The radar signals returning to the vehicle 100 (also referred to herein as received radar signals) are received by the receiver antenna 310, amplified by the amplifier 312, mixed by the mixer 314, and digitized by the sampler/digitizer 316. The received radar signals are then provided to the signal processing unit 226 for processing.

Figure 4A:
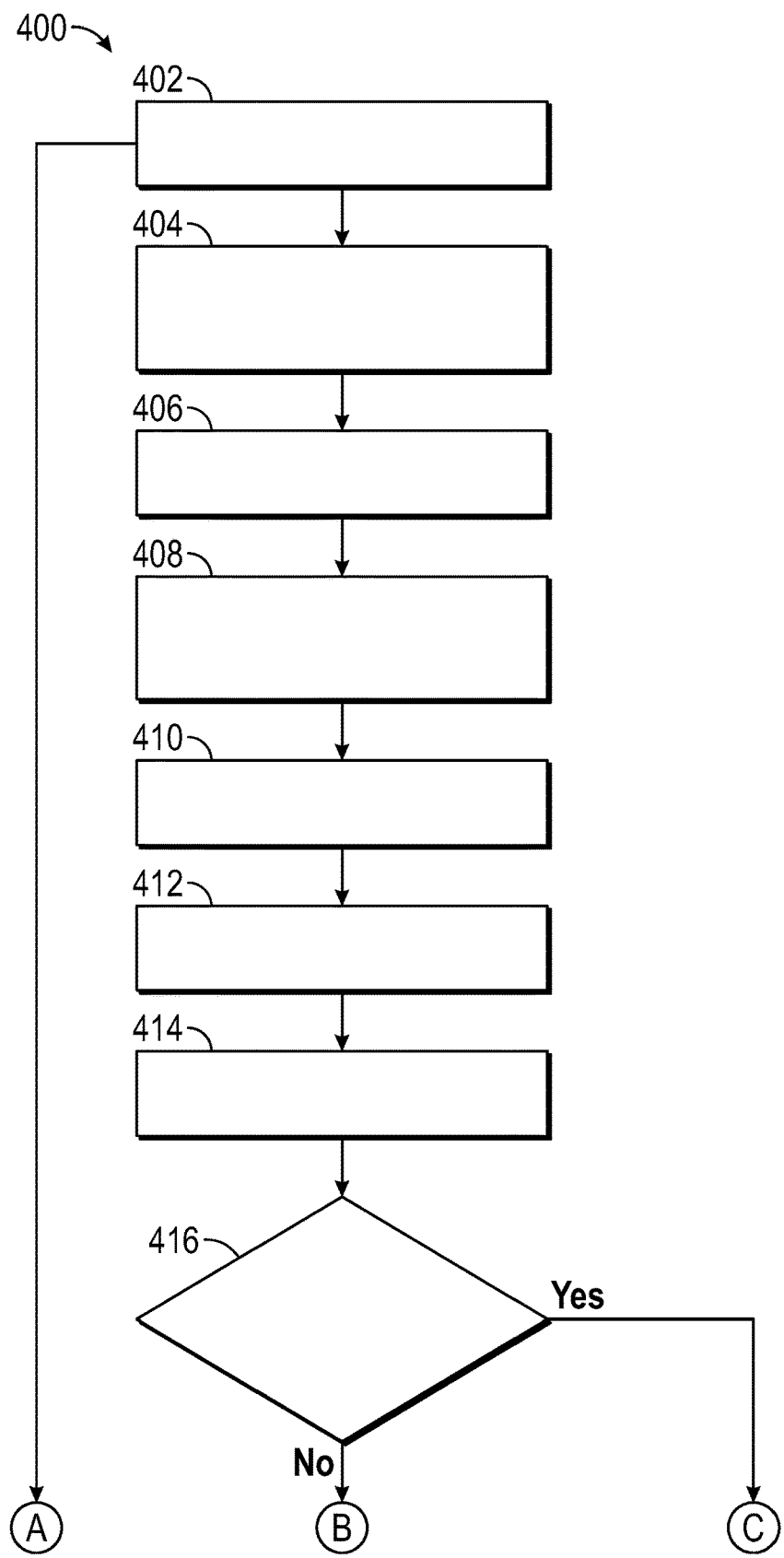
FIGS. 4A and 4B is a flowchart of a method for implementing object detection in a vehicle, which can be used in connection with the vehicle of FIG. 1, the control system of FIGS. 1 and 2, and the radar module of FIGS. 2 and 3, in accordance with an exemplary embodiment.
Figure 4B:
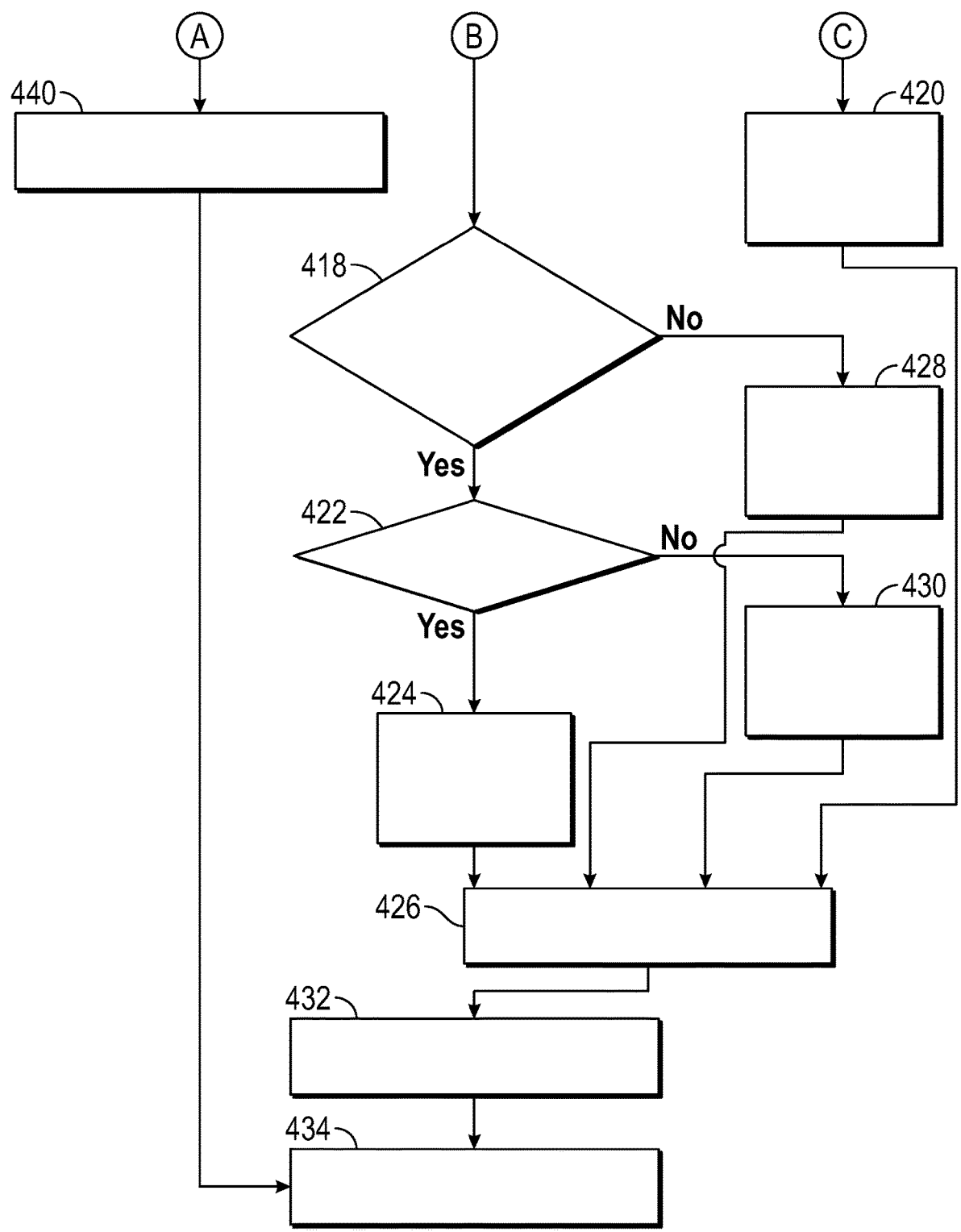

FIGS. 4A and 4B is a flowchart of a method 400 for implementing an object detection system of a vehicle 100, in accordance with an exemplary embodiment. The method 400 can be implemented in connection with the vehicle 100 of FIG. 1, the control system 102 of FIGS. 1 and 2, the USRR module 202 and controller 204 of FIG. 2, and the USRR module 202 of FIGS. 1-3, in accordance with an exemplary embodiment. The process 400 is also described below in connection with FIGS. 5 to 12, which illustrates data processing steps carried out by the systems and method described herein, particularly by the controller 204.

Figure 5:
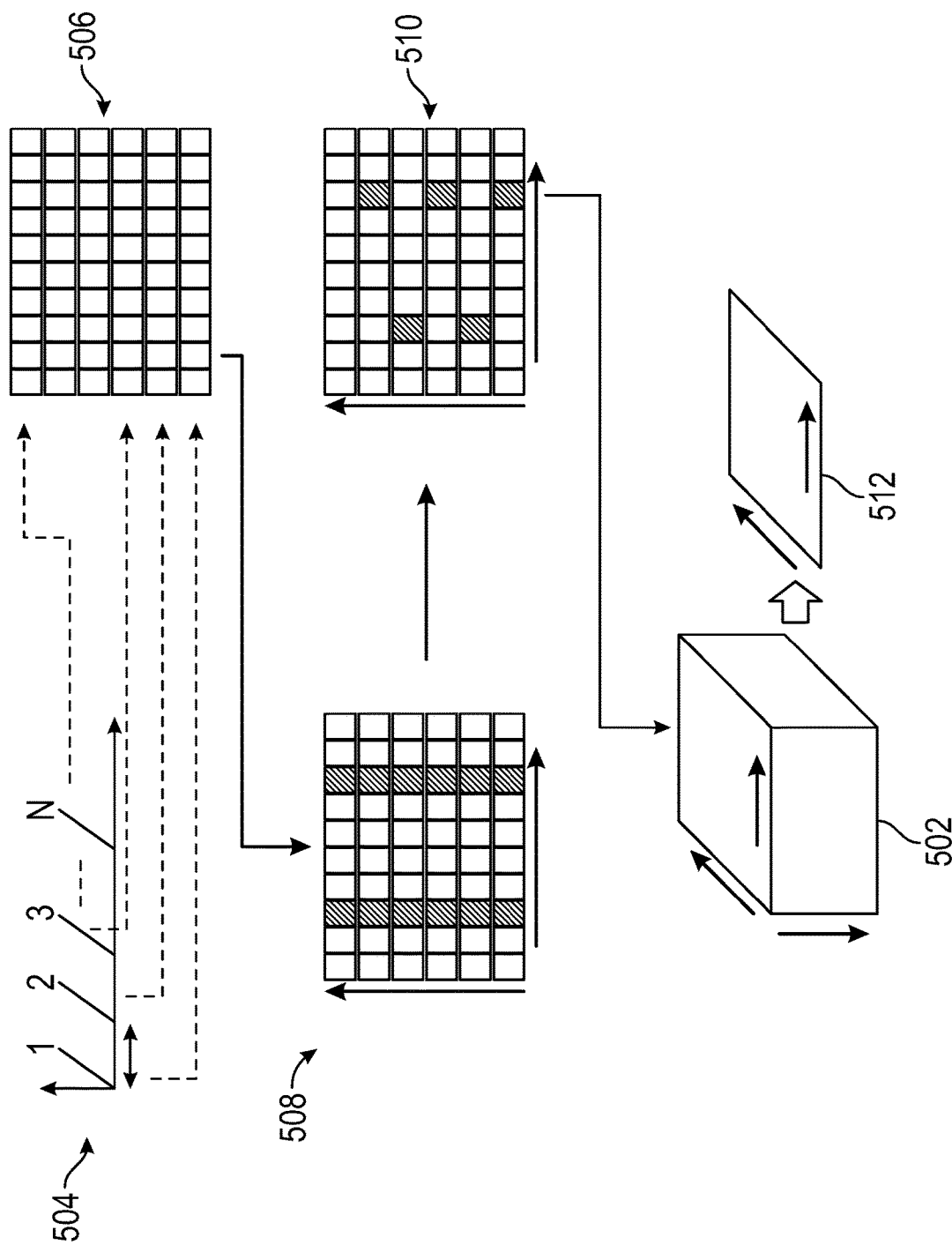
FIGS. 5 to 11 is an illustration of data transformations and processes associated with the method of FIGS. 4A and 4B, in accordance with an exemplary embodiment.

As depicted in FIGS. 4A and 4B, the method 400 includes step 402 of receiving arrays of range doppler data 502 (see FIG. 5). The arrays of range doppler data 502 are, in examples, three-dimensional arrays of range doppler data 502 including more than one range bin as a first dimension, more than one doppler bin as a second dimension and one or more (but generally more than one) channel as a third dimension. Thus, the range doppler data 502 is provided as a range-doppler cube having dimensions of $n_{range\ bins}$ by $n_{doppler}$ bins by $n_{channels}$. Each value in the array of range doppler data 502 is a complex number as will be discussed further below. In one example, the three-dimensional arrays of range doppler data 502 each include 512 range bins, 128 doppler bins and 12 channels. In embodiments, the arrays received in step 402 are separated by sample time intervals according to a sampling rate.

Arrays of range doppler data 502 are received by the controller 204 from the USRR module 202. In practice, a plurality of USRR modules 202 are included in vehicle 100, but just one USRR is described and illustrated for ease of understanding. With reference to FIGS. 3 and 5, USRR module 202 includes the at least one transmitter antenna 308 and the at least one receiver antenna 310. In one embodiment, there are three transmitter antennas 308 and four receiver antennas 310, thereby creating twelve virtual channels for the USRR module 202. Other numbers of transmitter and receiver antennas 308, 310 can be provided to create a different number of channels. In embodiments, the at least one transmitter antenna is configured to periodically output Frequency-Modulated Continuous Wave, FMCW, radar chirps as a transmit signal Tx, wherein each chirp has a waveform (e.g. sinusoidal) whose frequency increases or decreases linearly or non-linearly with time. The at least one receiver antenna 310 is configured to receive reflections (echoes) from one or more objects as a receive signal Rx. The mixer 314 is configured mix the Rx signal and the Tx signal to produce an IF (Intermediate Frequency) signal.

Continuing to Refer to FIGS. 3 and 5, the IF signal 504 is illustrated and includes IF chirps 1 to N. The forms of the IF chirps are shown purely schematically in FIG. 5. In accordance with various embodiments, the IF signal 504 is digitized through the sampler/digitizer 316 to provide digitized IF data 506. The digitized IF data is stored in a matrix of chirp index 1 to N and measured values. In the exemplary embodiment, each row corresponds to a respective chirp index. The signal processing unit 226 is configured to perform a range fast Fourier transform, FFT, on the digitized IF data 506 to provide a matrix of chirp index and range. The range FFT function is performed for each chirp (row) of the digitized IF data 506 to convert the digitized IF data into the frequency domain. A frequency of each peak in the frequency spectrum of an IF signal is proportional to a range of an object from which the receive signal Rx has reflected. Accordingly, the range FFT function resolves objects in distance range and produces chirp index—range data 508.

With further reference to FIGS. 3 and 5, the signal processing unit 226 is configured to perform a doppler FFT on the index—range data 508 over more than one (e.g. a predetermined number of IF chirp samples) chirp index in the chirp index—range data 508. The phase difference measured across consecutive chirps can be used to estimate the velocity of an object of reflection. The doppler FFT allows phase to be resolved, thereby providing information on velocity of objects from which the receive signal Rx has reflected. In the exemplary embodiment, the doppler FFT is performed along the column direction (a range bin) of the chirp index range data 508 to resolve each column in velocity. Thus, two dimensional, 2D, doppler range data 510 is provided in a matrix of discrete doppler (or velocity) and range (or distance) bins. The 2D doppler range data 510 is generated based on 1 to N chirps in transmit and receive signals Tx, Rx providing a single frame of 2D doppler range data 510. This process is repeated for each frame of 2D doppler range data 510. The 2D doppler range data 510 is gathered and combined from each channel (there are twelve channels in one example, but there can be one or more channels) to create three-dimensional, 3D, range doppler data 502, which is shown in the form of a so-called range doppler cube in FIG. 5. As a periodic succession of frames of 2D doppler range data 510 is provided, a periodic succession of frames of 3D range doppler data 502 is constructed at a set sampling interval.

Accordingly, FIG. 5 illustrates exemplary pre-processing steps for obtaining range doppler data 502 (which is 3D range doppler data 502 in multi-channel embodiments) that is sent from the USRR module 202 and received by the controller 204. The range doppler data 502 could be provided by other algorithmic processes in alternative embodiments.

In accordance with the present disclosure, and with reference to FIGS. 4 and 5, method 400 includes step 440 of calculating a range doppler energy map 512 from each incoming frame of range doppler data 502. For each cell in the range doppler data 502, the controller 204 computes a norm of the complex number included in the cell. To create the range doppler energy map 512, squares of the norm for each cell are summed across channels. An exemplary equation for computing the range doppler energy map 512 is:

$$E(ir,id)=\Sigma_k[\text{real}(C(ir,id,k))^2+\text{imag}(C(ir,id,k))^2] \qquad \text{(equation 1)}$$

Where E(ir, id) is the value of the energy map at range index ir and doppler index id.C is the range-doppler-channel complex cube (the range doppler data 502) and k is the channel index. The resulting range doppler energy map 512 is used by object detection computer module 243 to detect objects as will described further herein.

It has been found by the present inventors that the range doppler energy map 512 provides a good indication for object detection almost everywhere at a first couple/few/ several of range bins (low end of range bins) at doppler zero. The first range bins at Doppler zero are "contaminated" with a strong disturbance known as Short Range Leakage (SRL). SRL leakage can be due to internal leakages, Rx-Tx coupling, hardware packaging and radar mounting location. SRL leakage manifests as high energy levels at the "Close range—Doppler zero" area of the range doppler map (without real object presence). These high energy levels reduce signal to noise ratio (SNR) in the presence of a real object. Reduced SNR can lead either to loss of sensitivity or to increased false alarm rate. In accordance with the present disclosure, systems and methods described herein include an SRL mitigation computer module 241 (and associated processes) to detect objects in the SRL area and to clean range doppler data 502 of the effect of SRL leakage. At a high level, the SRL mitigation methods and systems described herein treat the high energy disturbance in the SRL area of the complex range doppler data 502 as the normal state. The SRL mitigation computer module 241 determines deviations from the normal state and provides a corresponding object detection output. Therefore, the SRL algorithms disclosed herein provide an anomaly detector for doppler zero, low range bins of the range doppler data 502.

In accordance with various embodiments, SRL mitigation processes embodied by SRL mitigation computer module 241 are provided by method steps 404 to 432 in FIGS. 4A and 4B. In embodiments, and with additional reference to FIG. 6, doppler zero slice data 514 ($\bar{x}_k$, where k is a time index) is extracted from the remaining range doppler data 502 in method step 404. The doppler zero slice data 514 is a subset of the range doppler data 502 that focuses on extracted data from doppler zero bin and just a few range bins (a predetermined number of range bins optionally selected from 2 to 10, but the appropriate number will be application specific) at the low end of the range bins in which SRL leakage manifests. The appropriate number of range bins for the doppler zero slice data 502 can be determined, for example, from the range doppler energy map 512 for USRR modules being used in a particular application and observing, in the absence of an object, high energy levels from surrounding lower energy levels at doppler zero range bins from range bin zero upwards. In the exemplary embodiment, six doppler zero range bins are extracted 0 to 5, which correspond to a distance range of about 0 to 0.5 meters. In some vehicle applications according to the present disclosure, an upper range limit for the doppler zero slice data is about 50 cm, about 40 cm, about 30 cm or about 20 cm. Referring to the exemplary embodiment of FIG. 6, the doppler zero slice data 514 is a 2D array of data extracted from each incoming frame of range doppler data 502 corresponding to doppler zero bin data and extracted for range bins 0 to 5 (in this example) and data from all channels (twelve channels in this example). Each cell in the doppler zero slice data 514 is a complex number.

Figure 6:
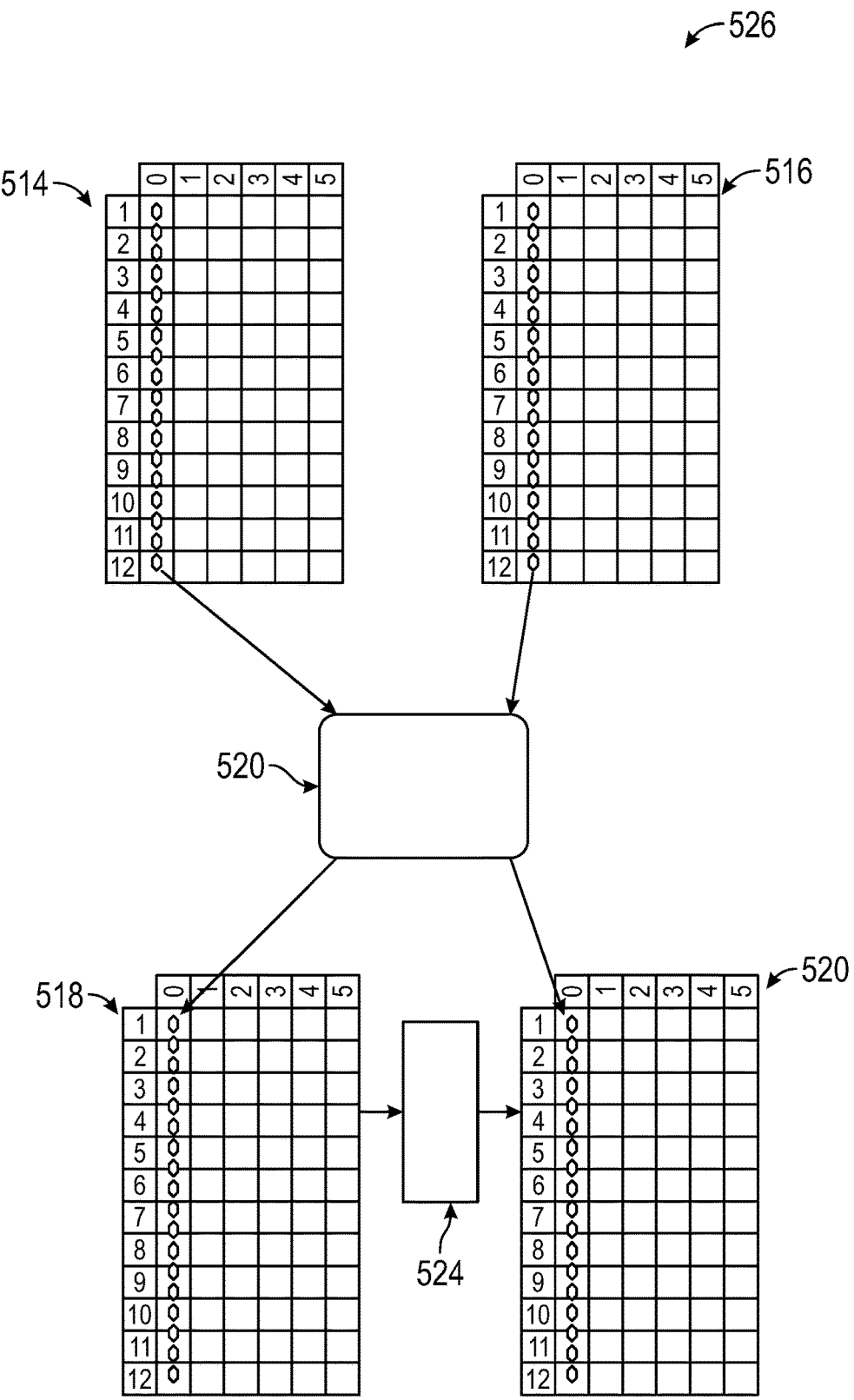

In embodiments, method 400 of FIGS. 4A and 4B includes method step 406, whereby a prediction of doppler zero slice data is retrieved. Referring to FIG. 6, the predicted doppler zero slice data 516 ($\hat{x}_k$) is shown in the form of a complex matrix having a size that is the same as that of the doppler zero slice data 514. The predicted doppler zero slice data 516 is initialized with values as part of a calibration process in the absence of objects in the range of the USRR module 202, in one embodiment. The predicted doppler zero slice data 516 is updated at each time step k depending upon one or more update conditions. The update process and update conditions will be described in further detail in the following. The predicted doppler zero slice data 516 represents an expected normal state for the doppler zero slice data 514 in the absence of objects in the low distance range of the USRR module 202. The predicted doppler zero slice data 516 is based on one or more previous frames of doppler zero slice data 514 and expected drift thereof, as will be described in the following. The SRL mitigation computer module 241 is configured to compare incoming frames of doppler zero slice data 514 with the predicted doppler zero slice data 516 to determine if there are any departures from (or anomalies as compared to) the normal state that would be indicative of an object in the low distance range of the USRR module 202.

In accordance with various embodiments, method 400 includes step 408 of calculating a best-fit version 518 ($\tilde{x}_k$) of the predicted doppler zero slice data. It has been found that mutual (between channels) gain variations can be caused by transmit power variations and mutual (between channels) phase change can be caused by mutual time delays as a result of hardware effects. Step 408 applies a best-fit process between the predicted doppler zero slice data 516 and the current frame of doppler zero slice data 514. From the best-fit process, a complex constant is utilized by which the predicted doppler zero slice data 514 is multiplied to better match the doppler zero slice data 514 by cancelling or strongly reducing mutual phase and gain variations. The transformation from predicted doppler zero slice data 516 to best-fit version of doppler zero slice data 518 does not affect differences between the prediction doppler zero slice data 516 and the current frame of doppler zero slice data 514 caused by reflection from an object. In embodiments, the best-fit version of predicted doppler zero slice data 518 is determined from the following equation, for each channel i:

$$\bar{x}_k^i = \underbrace{\frac{(\hat{x}_k^i)^H x_k^i}{(\hat{x}_k^i)^H \hat{x}_k^i}}_{1\times 1} \underbrace{\hat{x}_k^i}_{n_{ch}\times 1} \quad \text{(equation 2)}$$

Here, $\bar{x}_k^i$ is the 12-element (in the example of 12 channels) steering vector for range bin (i) at time step (k) included in the doppler zero slice data 514. $\hat{x}_k^i$ is the 12-element steering vector estimation for range bin (i) at time step (k) included in the predicted doppler zero slice data 516. (•)H stands for Hermite (transpose and complex conjugate). As such, the best-fit version of the predicted doppler zero slice data 518 is invariant to mutual gain and phase variations.

In accordance with various embodiments, method 400 includes step 410 of calculating prediction error data 520. Prediction error data 520 represents a difference between best-fit version of predicted doppler zero slice data 518 (which is being taken as representative of a normal state in the absence of an object) and a current frame of doppler zero slice data 514. The prediction error data 520 provides a 2D array of cells comprising complex numbers. The 2D array has range bins (0 to 5 in the specific example) in one dimension and channels (1 to 12 in the specific example) as the other dimension and provides data indicative of any anomalies as compared to the expectation in the absence of an object. The following equation can be used for determining prediction error data 520:

$$\check{e}_k^i = \bar{x}_k^i - \tilde{x}_k^i \quad \text{(equation 3)}$$

FIG. 6 provides an indication of the data transformation processes taking place in steps 404 to 410 of method 400 to calculate prediction error data 520, in accordance with various embodiments. Doppler zero slice data 514 and predicted doppler zero slice data 516 are received. A best-fit transformation function 520 (e.g. including equation 2) is used to scale and rotate the predicted doppler zero slice data 516 relative to the doppler zero slice data 514 to cancel mutual phase and gain changes, thereby providing best-fit version of predicted doppler data 518. An error estimation function 524 (e.g. incorporating equation 3) is applied to determine differences between the best-fit version of predicted doppler zero slice data 518 and the current frame of doppler zero slice data 514, thereby providing prediction error data 520.

Figure 7:
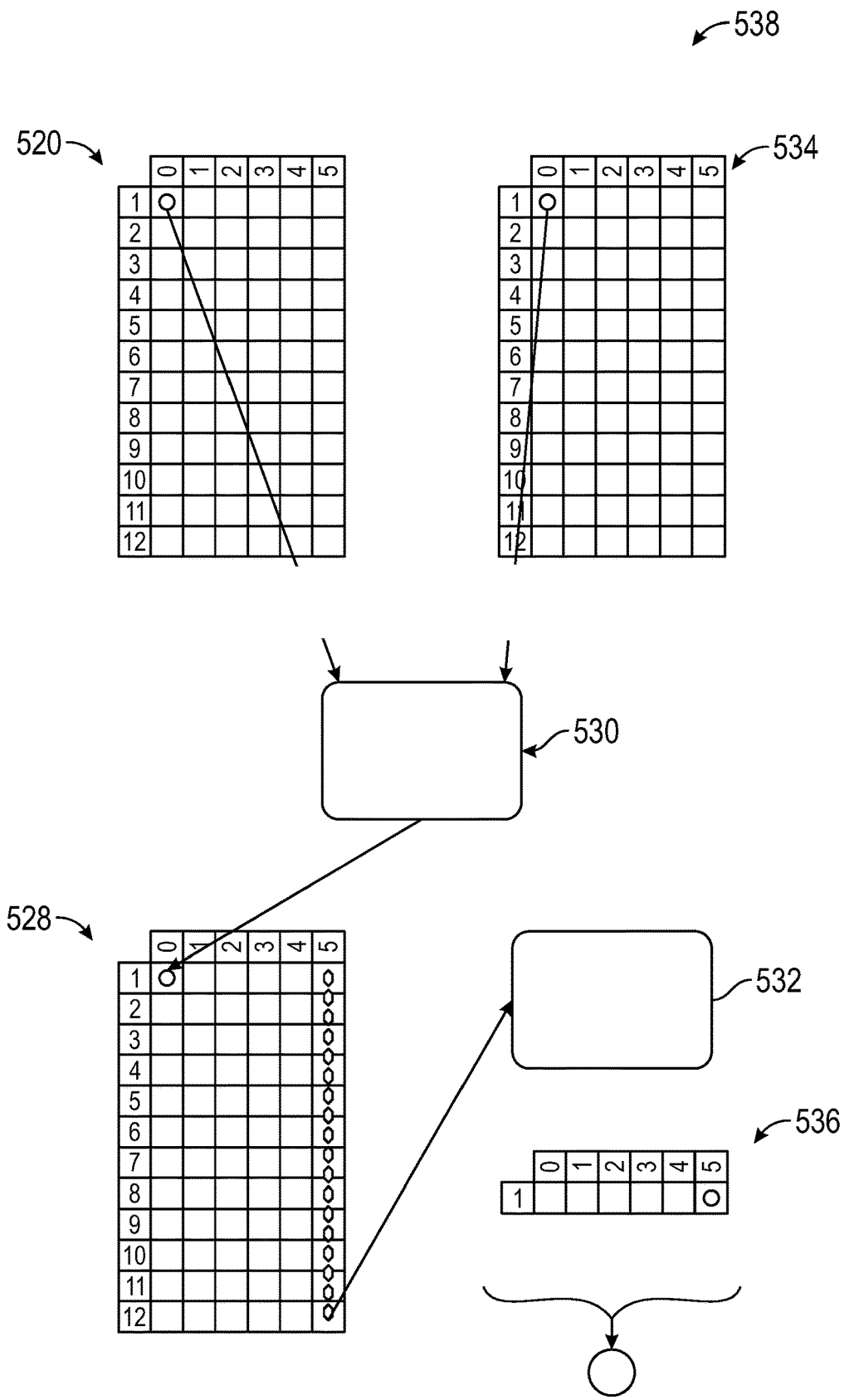

Referring back to FIGS. 4A and 4B, and in conjunction with FIG. 7, method 400 includes step 412 of calculating standard deviation data 528 based on the prediction error data 520. In embodiments, a standard deviation function 530 is used to calculate, for every range bin i and for every channel j, standard deviation data 528. The standard deviation function 530 converts the prediction error data 520 from units of power to units of standard deviations, allowing a "noisy" channel to be treated in the same way as a "well behaved" channel without having to sacrifice sensitivity or overfit thresholds. In embodiments, the standard deviation function 530 determines Mahalanobis distances for every cell using the following equation:

$$d_k^{i,j} = \sqrt{[\text{real}(\check{e}_k^{i,j})\ \text{imag}(\check{e}_k^{i,j})]\left(\begin{bmatrix}\hat{s}_{11} & \hat{s}_{12} \\ sym & \hat{s}_{22}\end{bmatrix}_k^{i,j}\right)^{-1}\begin{bmatrix}\text{real}(\check{e}_k^{i,j}) \\ \text{imag}(\check{e}_k^{i,j})\end{bmatrix}} \quad \text{(equation 4)}$$

Here, $$\left(\begin{bmatrix}\hat{s}_{11} & \hat{s}_{12} \\ sym & \hat{s}_{22}\end{bmatrix}_k^{i,j}\right) \quad \text{(equation 5)}$$

is taken from a covariance matrix 534 ($\tilde{S}_k$). The covariance matrix 534 is regularly updated based on certain update conditions being met, as will be described in detail below. The covariance matrix 534 represents the amount of scatter in the prediction error data 520. The covariance matrix 534 is initialized with values in an object free calibration process and subsequently updated at each time step k so to dynamically adapt to hardware drifts and external conditions. A 2D covariance matrix 534 is used by the standard deviation function 530 that represents an amount of scatter for real and imaginary parts of each range-channel combination in the prediction error data 520. The Mahalanobis distance $d_k$ of the standard deviation data 528 provides a distance value for each cell relative to the distribution of the prediction error data 520. Each cell in the standard deviation data 528 is a real number.

With continued reference to FIGS. 4 and 7, method 400 includes step 414 of calculating average standard deviation data 536 ($g_k$). An averaging function 532 is applied over all channels in order to transform 2D standard deviation data 528 into 1D average standard deviation data 536. The 1D average standard deviation data 536 is in the form of a vector of range bins (in this example 0 to 5), where each cell includes a real number. An example equation for the averaging function 532 is:

$$g_k^i = \frac{1}{n_{ch}}\sum_{j=1}^{n_{ch}} d_k^{i,j} \quad \text{(equation 6)}$$

FIG. 7 thus illustrates exemplary data transformation processes for calculating average standard deviation data (according to steps 412 and 414 of method 400) by which the prediction error data 520 and the standard deviation data are input to the standard deviation function 530 (e.g. incorporating equation 5) to produce standard deviation data 528. The standard deviation data 528 is then transformed to average standard deviation data 536 through use of an averaging function (e.g. incorporating equation 6).

Figure 8:
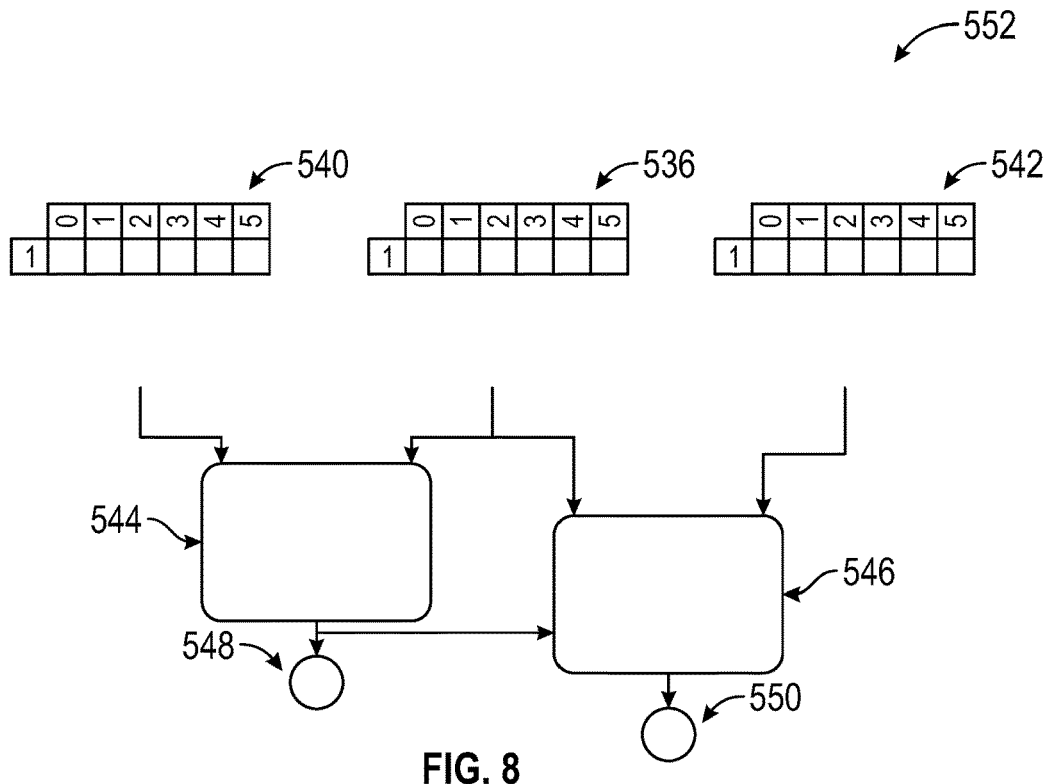

In accordance with various embodiments, and referring to FIGS. 4 and 8, method 400 includes step 416 of comparing, via first comparison function 544, average standard deviation data 536 and object detection threshold data 540. Object detection threshold data 540 is a threshold vector including threshold values for each range bin. The threshold values are set so that when the average standard deviation data 536 surpasses the threshold, then this is taken as an indication of an object being present at the distance range corresponding to the range bin. When it is determined that objection detection thresholds in data 540 are breached by average standard deviation data 536, method 400 follows 'YES' route via open loop update step 420, which is described further below. Further, object detection data 548 is set to be the first index in the average standard deviation data 536 that is greater than the threshold value in the corresponding object detection threshold data 540. In other embodiments, the highest element of the average standard deviation data 536 can also be set as the object detection data 548 (provided that the element has crossed the threshold). When it is determined that objection detection thresholds in data 540 are not breached by average standard deviation data 536, method 400 follows 'NO' route via step 418. Further, object detection data 548 is set to a nonce value (e.g. −1) indicating absence of object detection.

In step 418, a determination is made, via second comparison function 546, whether average standard deviation data 536 is greater than thresholds in anomaly detection threshold data 542. Like in step 416, the average standard deviation data 536 is a vector having the same number of cells as the average standard deviation data 536 so that different threshold values can be set for each range bin. The values of the thresholds in the anomaly detection threshold data 542 are lower than those of corresponding index numbers in the objection detection threshold data 540. When the comparison of step 418 reveals that average standard deviation data does not exceed anomaly detection threshold data 546, then method 400 proceeds via closed loop update in step 428. When the comparison of step 418 determines that the anomaly detection threshold data 542 is surpassed, method proceeds to step 422 to determine whether average standard deviation data 536 is greater than anomaly detection threshold data 542 in a persistent way. If persistence is determined, then this condition would indicate that a closed loop update should be performed in step 424. If persistence is not determined, then this condition would indicate that an open loop update should be performed in step 430. Persistence can be determined on the basis of the condition of step 418 being maintained for a predetermined number of successive frames.

Method steps 416 to 430 serve to set the object detection data 548 and also serve to decide whether open loop (see steps 420 and 430) or closed loop (see steps 424 or 426) update processes should be followed. Open loop updates operate when an object has been detected and when momentary (non-persistent) anomalous disturbances occur. Closed loop updates operate when an object and an anomaly has not been detected, allowing surety in object free space for update processes. Closed loop updates also operate when a persistent anomaly is detected because the change is not momentary but is also not a target so parameters should be adapted.

Figure 10:
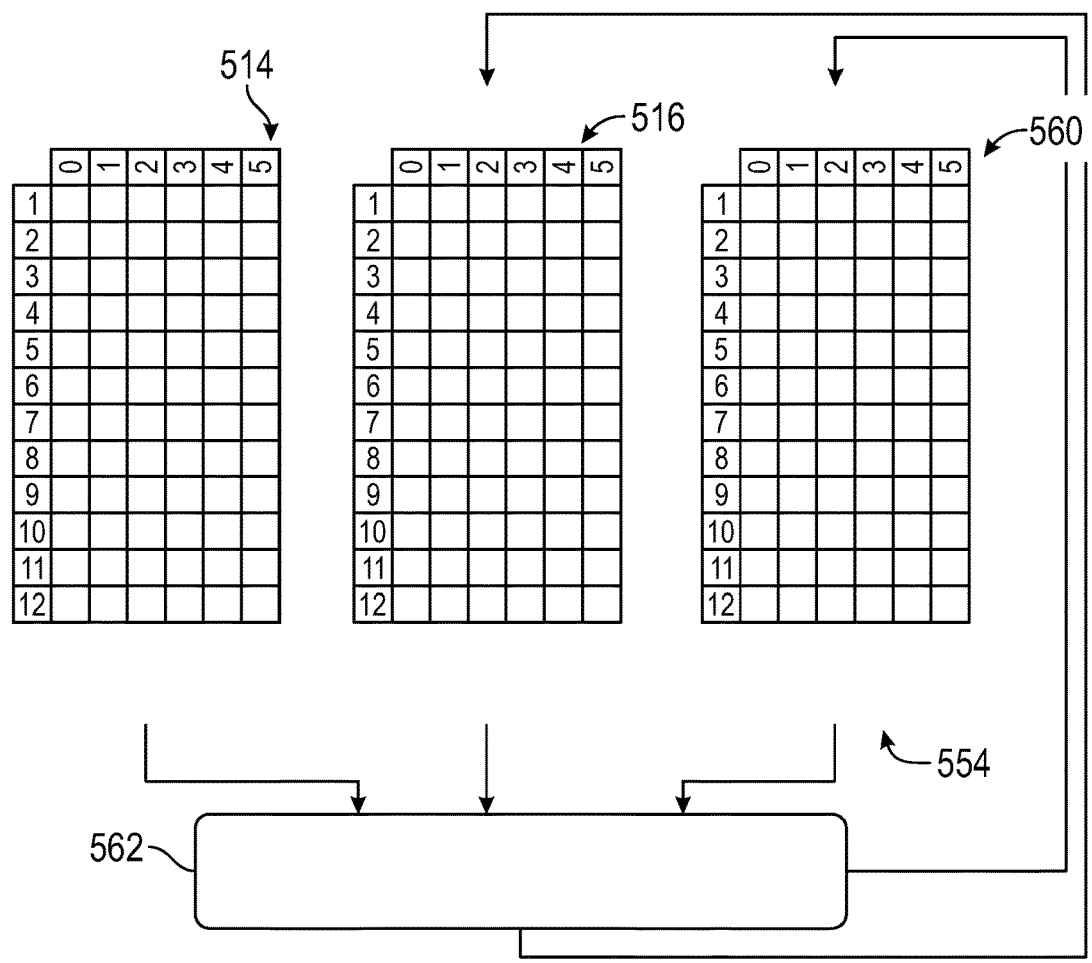

In accordance with various embodiments, the closed loop update of steps 424 and 428 includes updating both the predicted doppler zero slice data 516 and the covariance matrix 534. With reference to FIG. 10, data transformations for a closed loop update process for the predicted doppler zero slice data 516 are illustrated according to an exemplary embodiment. A prediction update function 562 updates predicted doppler zero slice data 516 based on current doppler zero slice data 514 and a time derivate (time rate of change) 554 of current predicted doppler zero slice data 516, to determine updated predicted doppler zero slice data $\hat{x}_{k+1}$ (not shown). The rate of change data 554 is representative of rate of prediction drift over time step k. In embodiments, prediction update function 562 includes the following equations:

$$\ddot{e}_k = \ddot{x}_k - \dot{\hat{x}}_k \quad \text{(equation 7)}$$

$$\dot{\hat{x}}_{k+1} = \dot{\hat{x}}_k + \Delta t \cdot \ddot{\hat{e}}_k + l_1 \cdot \ddot{e}_k \quad \text{(equation 8)}$$

$$[\slash S]\hat{S}\hat{\$\$}[\slash S]\hat{S}^{\hat{}}A\hat{a}\hat{x}_{k+1} = [\slash S]\hat{S}\hat{\$\$}[\slash S]\hat{S}^{\hat{}}A\hat{a}\hat{x}_k + l_2 \cdot \ddot{e}_k \quad \text{(equation 9)}$$

The estimator parameters: $l_1$, $l_2$ and $\alpha$ are tuneable parameters while $\Delta t$ is a time between frame samples. Equation 8 updates predicted doppler zero slice data 516 for use in method 400 at the next time step (with the next incoming frame of data). The update is based on prediction drift and an error between current doppler zero slice data 514 and predicted doppler zero slice data 516 (equation 7). Equation 9 determines rate of change of predicted doppler zero slice data for use in method 400 in conjunction with the next incoming frame of data.

Figure 11:
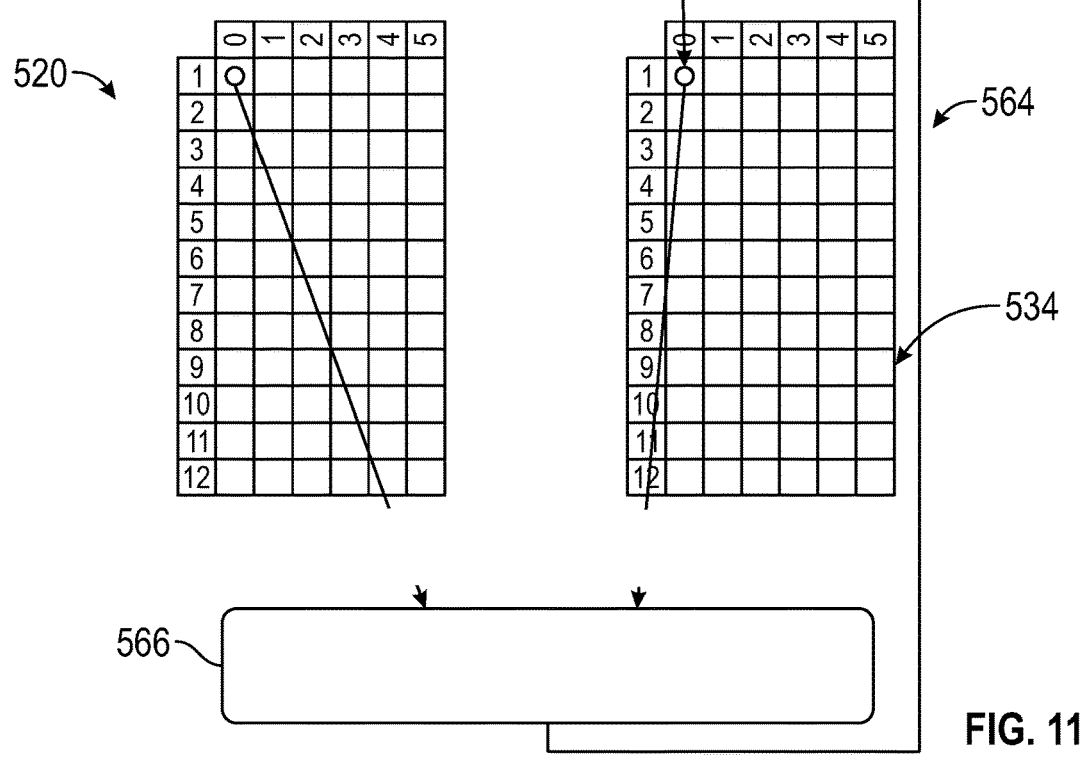

In accordance with various embodiments, the closed loop update of steps 424 and 428 includes an update process for the covariance matrix 534. With reference to FIG. 11, data transformations for a closed loop update process for the covariance matrix 534 are illustrated according to an exemplary embodiment. A covariance update function 566 takes prediction error data 520 and covariance matrix 534 as inputs and outputs an updated version of the covariance matrix which takes into account data distribution of the current prediction error data 520. In one example, covariance update function 566 includes the following equation: For each range bin i and every channel j:

$$\hat{S}_{k+1}^{i,j} = (1-\alpha)\hat{S}_k^{i,j} + \alpha\left(\begin{bmatrix} \text{real}(\hat{e}_k^{i,j}) \\ \text{imag}(\hat{e}_k^{i,j}) \end{bmatrix}[\text{real}(\hat{e}_k^{i,j}) \ \text{imag}(\hat{e}_k^{i,j})] + s_{reg}\begin{bmatrix} 1 & 0 \\ 0 & 1 \end{bmatrix}\right) \quad \text{(equation 9)}$$

sreg is a tuneable value intended to make sure that the updated covariance matrix 534 remains invertible.

Figure 9:
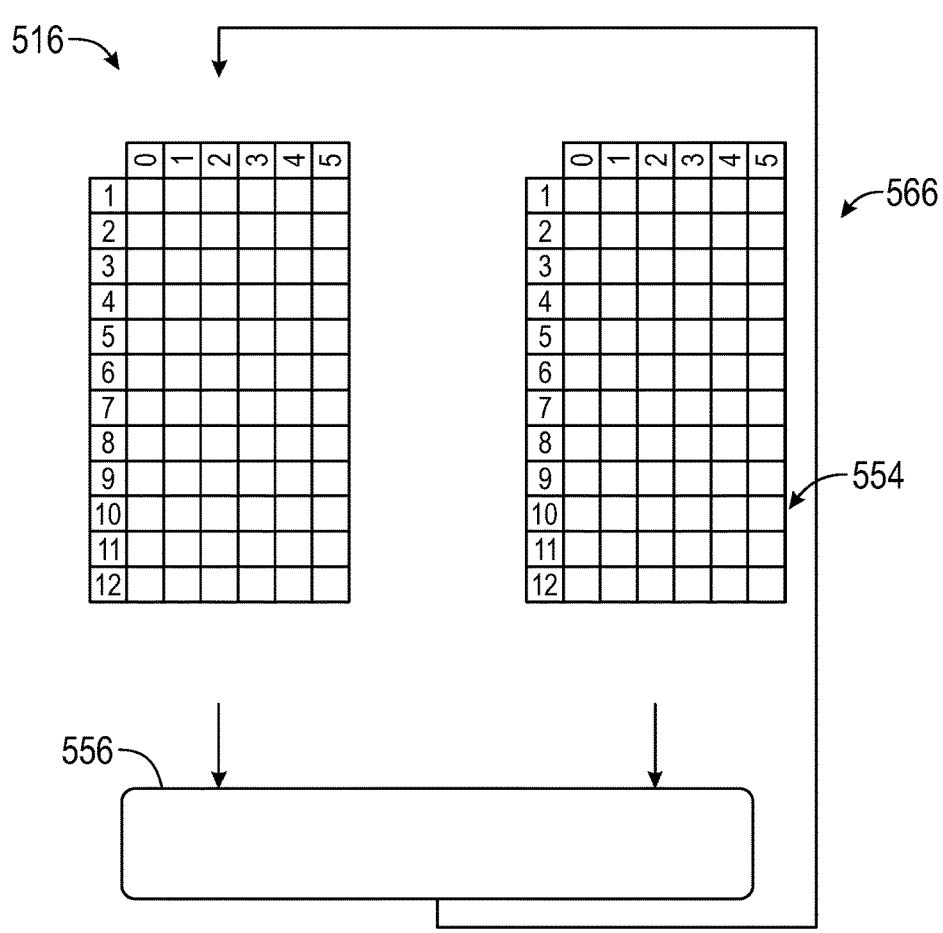

In accordance with various embodiments, and with reference to FIG. 9, data transformations are illustrated as part of an open loop update 566 of predicted doppler zero slice data. An open loop prediction update function 556 uses predicted doppler zero slice data 516 and rate of change of predicted doppler zero slice data 554 (prediction drift) and outputs updated predicted doppler zero slice data for use with processes of method 400 for the next incoming frame of range doppler data 502. The open loop prediction update function 556 operates based on prediction drift (rate of change data 554) and a time step between frames in determining changes to make to current predicted doppler zero slice data 516. An exemplary equation for open loop prediction update function 556 is:

$$\hat{x}_{k+1} = \hat{x}_k + \Delta t \cdot \dot{\hat{x}}_k \quad \text{(equation 10)}$$

In accordance with one example, FIG. 8 illustrates data transformations and associated processes for object detection 552. Method steps 416 to 430 of FIGS. 4A and 4B are embodied by the data transformations and objection detection processes 552 of FIG. 8. When average standard deviation data 536 is greater than object detection threshold data 540 (when values from corresponding indexes are compared in first comparison function 544), object detection data 548 is set to the first index for which the object detection threshold is exceeded. If all cells of average standard deviation data 536 are less than the corresponding object detection threshold data 540, then object detection data 548 is set to a predetermined nonce value such as −1. When the average standard deviation data 536 is greater than the anomaly detection threshold data 542 and the object detection data 548 is set to the nonce value (i.e. when the average standard deviation data 536 is between the thresholds of the object detection threshold data 540 and the anomaly detection threshold data 542), then anomaly detection output 550 is set to indicate true. Otherwise, anomaly detection output 550 is set to false. The anomaly detection output 550 is then used to determine whether closed or open loop update processes (as described above) should be used. More particularly, if object detection data 548 is not equal to the nonce value (i.e. a target was detected) or anomaly detection output is false, then the open loop update process of FIG. 9 is used (see steps 416, 418, 420 and 428 of FIGS. 4A and 4B). If the anomaly detection output 550 is true but it has only been true for a successive frame count of less than a predetermined value (representative of persistence), then the open loop update process of FIG. 9 is used (see steps 422 and 430 of FIGS. 4A and 4B). If anomaly detection output 550 is true and has been true for a successive frame count of greater than a predetermined value (representative of persistence), then the closed loop update process of FIGS. 10 and 11 is used (see steps 422 and 424 of FIGS. 4A and 4B).

In accordance with some embodiments, and referring to FIGS. 4 and 6, method 400 includes a further step 432 of short-range leakage, SRL, attenuation. SRL attenuation step 432 receives the 3D range doppler data 502 and the best-fit version of predicted doppler zero slice data 518 as inputs. The best-fit version of predicted doppler zero slice data 518 is used for subtracting SRL disturbances from the 3D range doppler data 502 to provide a clean version of 3D range doppler data at doppler zero bin. For other doppler bins an assumption is made that the disturbance propagates proportionally to a known complex constant which is a function of doppler bin index and calculated disturbance propagation values are subtracted from the 3D range doppler data to provide final clean 3D range doppler data. An SRL attenuation function is used in step 432 and includes, in embodiments, the following equation:

$$z_k^{i,j,m} = z_k^{i,j,m} - \ddot{x}_k^{i,j} \cdot \text{kaiser}^m \quad \text{(equation 11)}$$

The SRL attenuation function applies for all range bins i, for all channels j and for all doppler bins m. Here, kaiser is the frequency response of a kaiser sampling window. $z_k^{i,j,m}$ is a current frame of range doppler data 502.

Thus, method 400, and SRL mitigation computer module 241 executed by controller 204, are able to generate object detection data 548 and SRL cleaned 3D doppler range data. Object detection data 548 indicates whether an object has been detected in the short-range area in a way that avoids false detections by comparing current doppler zero slice data to a dynamically updated prediction for doppler zero slice data. The SRL cleaned 3D doppler range data subtracts SRL leakage effects from received 3D range doppler data 502. In accordance with step 432 of method 400 of FIGS. 4A and 4B, these outputs are provided to object detection computer module 243 for use in further object detection processes, as will be briefly described herein. Yet further, the range doppler energy map 512 (FIG. 5) is provided to the object detection computer module 243 for use in further object detection processes as part of step 432.

In embodiments, object detection computer module 243 is configured to receive various outputs from SRL mitigation computer module 241 and from method step 432. The object detection computer module 243 is configured to perform object detection and/or object tracking processes thereon and to output at least one vehicle control command (e.g. to electronic control system 118). For example, object detection computer module 243 is configured to estimate direction of arrival of an object based on the cleaned 3D range doppler data, thereby allowing more accurate results.

It will be appreciated that the disclosed methods, systems, and vehicles may vary from those depicted in the Figures and described herein. For example, the vehicle 100, the control system 102, the USRR module 202, the controller 204, and/or various components thereof may vary from that depicted in FIGS. 1-3 and described in connection therewith.

In addition, it will be appreciated that certain steps of the method 400 may vary from those depicted in FIGS. 4A and 4B and/or described above in connection therewith (e.g. by reference to FIGS. 5 to 11). It will similarly be appreciated that certain steps of the method described above may occur simultaneously or in a different order than that depicted in FIGS. 4A and 4B and/or described above in connection therewith with reference to FIGS. 5 to 11.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method of object detection using a radar module, the method comprising:

at least one processor receiving, from a radar module, frames of range and doppler data at sample time intervals, each frame of the range and doppler data comprising an array including range bins and doppler bins;

the at least one processor extracting doppler zero slice data from a current frame of the range and doppler data, the doppler zero slice data corresponding to a zero doppler bin that has been extracted from remaining doppler bins in the range and doppler data and also corresponding to at least one range bin at a distance range that includes a zero range bin that has been extracted from remaining higher range bins in the range and doppler data;

the at least one processor maintaining a prediction of doppler zero slice data using a prediction function that utilizes at least doppler zero slice data from a previous frame of range and doppler data and a rate of change term representing expected drift of the doppler zero slice data from a previous frame of range and doppler data, wherein the at least one processor maintaining a prediction of doppler zero slice data comprises scaling and rotating the prediction of doppler zero slice data relative to the doppler zero slice data using a best fit function to cancel out mutual phase and gain variations;

the at least one processor determining standard deviation data based at least partly on prediction error data, the prediction error data related to a difference between the prediction of doppler zero slice data and the doppler zero slice data; and the at least one processor providing an object detection output based on a comparison of the standard deviation data and an object detection threshold.

2. The method of claim 1, wherein the range and doppler data comprises a complex array including $n_{range\ bins}$ by $n_{doppler\ bins}$ by $n_{channels}$, wherein $n_{range\ bins}$ is an integer number of range bins greater than one in the complex array of range doppler data, $n_{doppler\ bins}$ is an integer number of doppler bins greater than one in the complex array of range doppler data and $n_{channels}$ is an integer number of one or greater in the complex array of range doppler data and corresponds to a number of channels of the radar module, and the doppler zero slice data comprises a complex array including $p_{range\ bins}$ by one doppler zero bin by $n_{channels}$, wherein $p_{range\ bins}$ is an integer number of range bins of one or greater, $p_{range\ bins}$ is less than $n_{range\ bins}$ and $p_{range\ bins}$ has been extracted from a low range end of $n_{range\ bins}$ in the complex array of range doppler data.

3. The method of claim 1, wherein the at least one processor determining standard deviation data is performed at least in part by calculating Mahalanobis distances based at least partly on a difference between the prediction of doppler zero slice data and the doppler zero slice data.

4. The method of claim 3, wherein the calculation of Mahalanobis distances uses covariance matrices for the prediction error data.

5. The method of claim 4, wherein when one or more conditions for updating are determined to be true, the method comprises updating the covariance matrices based on the prediction error data determined for the current frame of range and doppler data.

6. The method of claim 3, wherein the range and doppler data comprises a three-dimensional array including range bins as a first dimension, doppler bins as a second dimension and channels as a third dimension, wherein each channel corresponds to a channel of the radar module, and the standard deviation data comprises an average of Mahalanobis distances for each of the at least one range bin that has been averaged over each channel.

7. The method of claim 1, wherein when one or more conditions for updating are determined to be true, updating the prediction of doppler zero slice data based on the prediction error data determined for the current frame of range and doppler data and prediction drift data related to rate of change of the prediction of doppler zero slice data.

8. The method of claim 7, wherein when the one or more conditions for updating are determined to be false, updating the prediction of doppler zero slice data based on prediction drift data related to rate of change of the prediction of doppler zero slice data.

9. The method of claim 7, wherein the one or more conditions include a first condition of determining whether values of the standard deviation data exceed an anomaly detection threshold, wherein the anomaly detection threshold is lower than the object detection threshold and a second condition of determining whether the first condition is true for each of a predetermined number of successive frames of range and doppler data, or a third condition of the standard deviation data being less than the anomaly detection threshold.

10. The method of claim 1, wherein the range and doppler data comprises a three-dimensional array including range bins as a first dimension, doppler bins as a second dimension and channels as a third dimension, wherein each channel corresponds to a channel of the radar module.

11. The method of claim 1, comprising determining a cleaned version of the range doppler data cleaned for effects of short-range leakage, SRL, based on an SRL attenuation function that subtracts the prediction of doppler zero slice data and a calculated propagation thereof and output the cleaned version.

12. A system for object detection comprising:
a radar module; and
at least one processor;
the at least one processor configured to:
receive, from the radar module, frames of range and doppler data at sample time intervals, each frame of the range and doppler data comprising an array including range bins and doppler bins;
extract doppler zero slice data from a current frame of the range and doppler data, the doppler zero slice data corresponding to a zero doppler bin that has been extracted from remaining doppler bins in the range and doppler data and also corresponding to at least one range bin at a distance range that includes a zero range bin that has been extracted from remaining higher range bins in the range and doppler data;
maintain a prediction of doppler zero slice data using a prediction function that utilizes at least doppler zero slice data from a previous frame of range and doppler data and a rate of change term representing expected drift of the previous frame of range and doppler data, wherein the at least one processor being configured to maintain a prediction of doppler zero slice data comprises scaling and rotating the prediction of doppler zero slice data relative to the doppler zero slice data using a best fit function to cancel out mutual phase and gain variations;
determine standard deviation data based at least partly on prediction error data, the prediction error data related to a difference between the prediction of doppler zero slice data and the doppler zero slice data; and
provide an object detection output based on a comparison of the standard deviation data and an object detection threshold.

13. The system of claim 12, wherein the range and doppler data comprises a three-dimensional array including range bins as a first dimension, doppler bins as a second dimension and channels as a third dimension, wherein each channel corresponds to a channel of the radar module.

14. The system of claim 12, wherein the radar module comprises at least one transmitter and receiver antenna corresponding to a channel of the radar module, the at least one transmitter configured to transmit Frequency-Modulated Continuous Wave, FMCW, chirps at respective time intervals and the receiver is configured to output receive signals correspond to each FMCW chirp.

15. The system of claim 14, comprising at least one signal processor configured to perform a range fast Fourier transform, FFT, function on each receive signal to provide range data for each receive signal, the at least one processor configured to perform a doppler FFT function on the range data for a plurality of receive signals to provide range doppler data, the at least one signal processor configured to arrange the range doppler data into bins for each channel of the radar module as part of providing the frames of range and doppler data at sample time intervals.

16. The system of claim 12, wherein the at least one processor is configured to determine standard deviation data by, at least in part, calculating Mahalanobis distances based at least partly on a difference between the prediction of doppler zero slice data and the doppler zero slice data.

17. The system of claim 16, wherein the range and doppler data comprises a three-dimensional array including range bins as a first dimension, doppler bins as a second dimension and channels as a third dimension, wherein each channel corresponds to a channel of the radar module, and the standard deviation data comprises an average of Mahalanobis distances for each of the at least one range bin that has been averaged over each channel.

18. The system of claim 12, wherein when one or more conditions for updating are determined to be true, the at least one processor configured for updating the prediction of doppler zero slice data based on the prediction error data determined for the current frame of range and doppler data and prediction drift data related to rate of change of the prediction of doppler zero slice data, and when the one or more conditions for updating are determined to be false, the at least one processor configured for updating the prediction of doppler zero slice data based on prediction drift data related to rate of change of the prediction of doppler zero slice data, wherein the one or more conditions include a first condition of determining whether values of the standard deviation data exceed an anomaly detection threshold, wherein the anomaly detection threshold is lower than the object detection threshold and a second condition of determining whether the first condition is true for each of a predetermined number of successive frames of range and doppler data, or a third condition of the standard deviation data being less than the anomaly detection threshold.

19. A vehicle comprising:
   at least one radar module; and
   at least one processor;
   the at least one processor configured to:
      receive, from the at least one radar module, frames of range and doppler data at sample time intervals, each frame of the range and doppler data comprising an array including range bins and doppler bins;
      extract doppler zero slice data from a current frame of the range and doppler data, the doppler zero slice data corresponding to a zero doppler bin that has been extracted from remaining doppler bins in the range and doppler data and also corresponding to at least one range bin at a distance range that includes a zero range bin that has been extracted from remaining higher range bins in the range and doppler data;
      maintain a prediction of doppler zero slice data using a prediction function that utilizes at least doppler zero slice data from a previous frame of range and doppler data and a rate of change term representing expected drift in the previous frame of range and doppler data, wherein the at least one processor being configured to maintain a prediction of doppler zero slice data comprises scaling and rotating the prediction of doppler zero slice data relative to the doppler zero slice data using a best fit function to cancel out mutual phase and gain variations;
      determine standard deviation data based at least partly on prediction error data, the prediction error data related to a difference between the prediction of doppler zero slice data and the doppler zero slice data;
      provide an object detection output based on a comparison of the standard deviation data and an object detection threshold; and
      command a vehicle function based on the object detection output.

* * * * *